Dec. 1, 1964   J. H. MARSTELLER   3,159,704
METHOD AND MEANS FOR MELTING AND CONVEYING METAL
Filed March 20, 1961   2 Sheets-Sheet 1
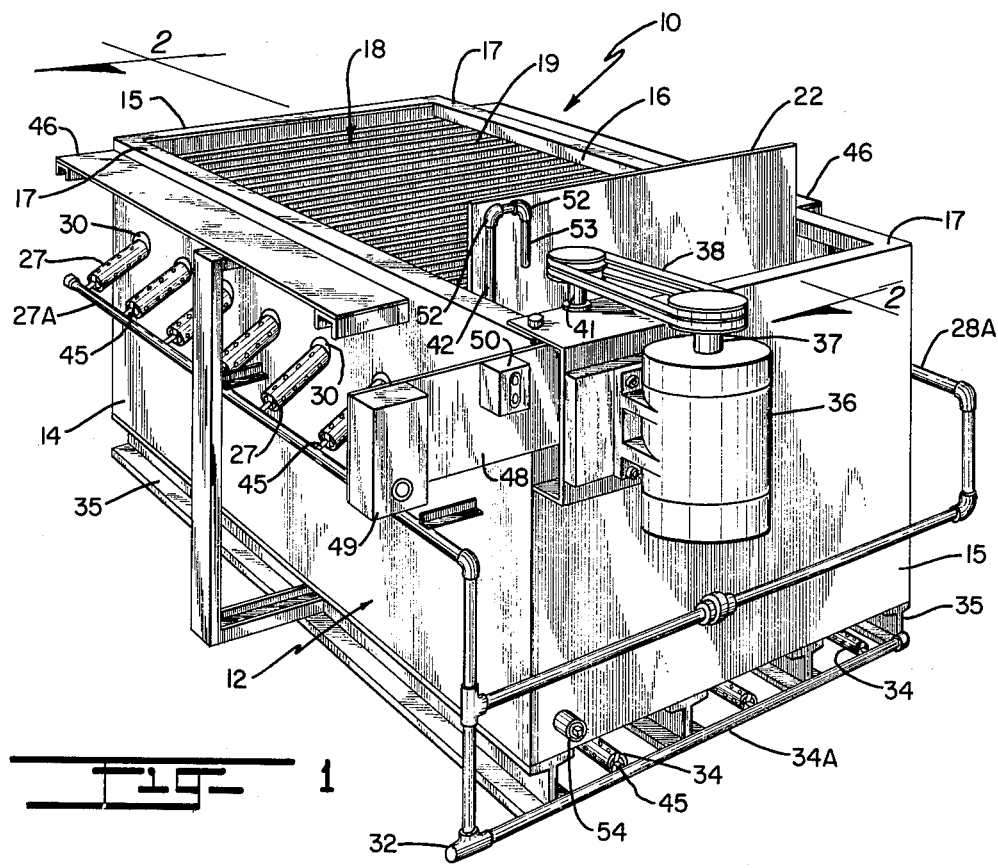
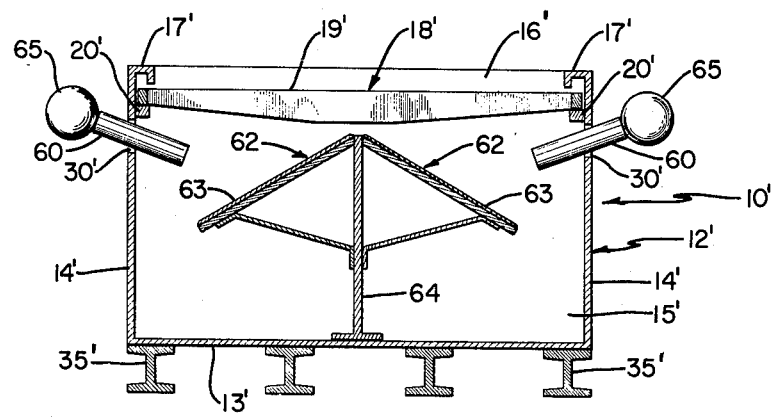
INVENTOR.
JAMES H. MARSTELLER
BY
John E. Reilly
ATTORNEY Dec. 1, 1964  J. H. MARSTELLER  3,159,704
METHOD AND MEANS FOR MELTING AND CONVEYING METAL
Filed March 20, 1961  2 Sheets-Sheet 2
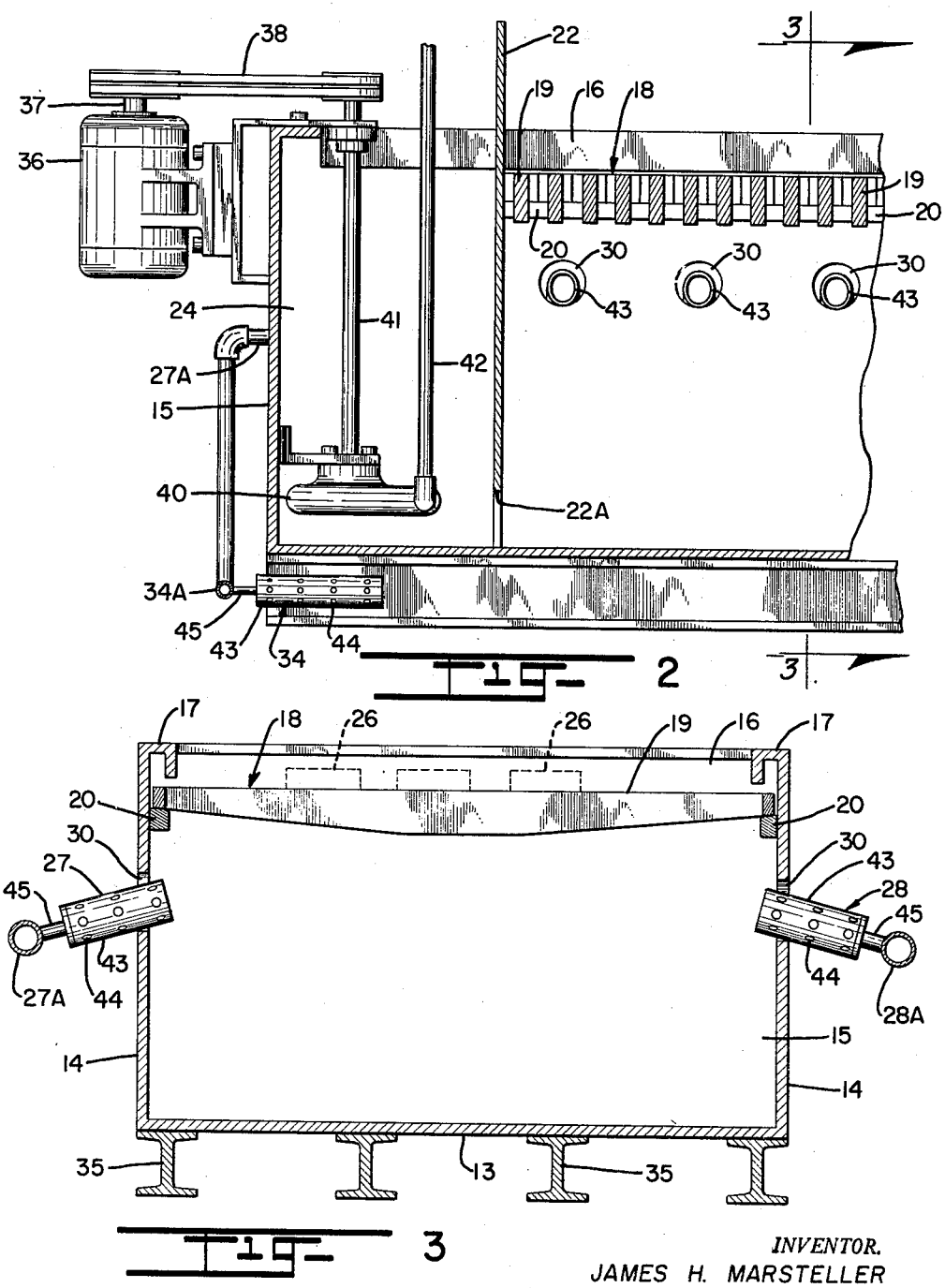
INVENTOR.
JAMES H. MARSTELLER
BY John E. Reilly
ATTORNEY United States Patent Office 3,159,704
Patented Dec. 1, 1964

3,159,704
METHOD AND MEANS FOR MELTING
AND CONVEYING METAL
James H. Marsteller, Denver, Colo., assignor to Universal Natural Resources, Inc., Denver, Colo., a corporation of Colorado
Filed Mar. 20, 1961, Ser. No. 97,031
7 Claims. (Cl. 266—33)

This invention relates to a new and useful method and means for melting and handling non-ferrous metals and metal alloys, especially low melting point metals such as lead and zinc; and more particularly, this invention relates to a new and improved furnace construction for melting and holding metals in the molten state for subsequent removal or delivery to the intended point of use.

It is often desirable to convert metals to their molten state in various applications, for example, in forming high strength, high density foundations, weights or counterweights and in such applications the low melting point metals are especially suitable. Thus, lead is a very high density metal yet relatively inexpensive and has a melting point below 850° Fahrenheit. On the other hand, due to its high density, and particularly in applications requiring a large mass or great deal of weight, lead is very difficult to successfully handle unless some portable means is provided for rapidly melting and conveying it in the molten state to the site of use. In this connection, formerly it has been found difficult to heat it and other materials rapidly enough and to convey them in a continuous manner either by direct or indirect heating methods and apparatus and especially through the use of portable apparatus alone.

Accordingly, it is a principal and foremost object of the present invention to provide for a new and useful method and means for melting, protecting and holding metals in the fluid state for conveyance to the point of intended use, and in such a way that the metals can be safely and easily handled.

It is another object to make provision for a new and improved furnace construction for direct flame heating of metals to reduce them to the molten state in a rapid, continuous manner and where the entire construction is characterized by its portability, extremely high heat capacity and efficiency in use.

It is a further object of the present invention to provide for a rapid and effective means of flame melting, directly or indirectly, low melting point metals such as lead and zinc, which means is durable and dependable in operation, as well as a method of rapidly and continuously melting and conveying metals while in the fluid state to the intended point of use for various applications.

Broadly, in accordance with the present invention, a furnace construction has been devised which is conformable for use in melting and holding virtually any type of non-ferrous metal or alloy thereof, provided its melting point is within the temperature range of the materials of construction. Moreover, a method of melting and handling the metals in the fluid state has been devised whereby it is possible to rapidly and efficiently reduce the metals to the molten state, hold them in that state, and convey them to the intended point of use, all in a rapid and continuous manner.

The above and other objects, advantages and features of the present invention will become more readily understood from a consideration of the following detailed description, taken together with the accompanying drawings, in which:

FIGURE 1 is a perspective view of a preferred form of furnace construction in accordance with the present invention.

FIGURE 2 is a fragmentary, detailed section view taken on lines 2—2 of FIGURE 1.

FIGURE 3 is another detailed cross-sectional view of the form illustrated in FIGURE 1; and FIGURE 4 is a cross-sectional view of a modified form of furnace construction, in accordance with the present invention.

Referring in detail to the drawings, the preferred form is illustrated by way of example in FIGURES 1-3 where there is shown a furnace 10 broadly comprised of a main shell or chamber 12 preferably of generally rectangular configuration having a bottom wall 13, side walls 14 and end walls 15 with an open top area 16 defined by inturned top peripheral rim portion 17. Positioned in spaced relation just beneath the top edge of the shell is a grate 18 preferably in the form of spaced, horizontally extending bars 19 supported at each end by means of blocks 20 affixed to each of the respective side walls 14. The grate traverses the greater length of the furnace from one end wall to a vertical partition 22 positioned adjacent to, but spaced from, the other end wall so as to define an open conveyor area 24 isolated from the main heating area or chamber of the furnace.

Metal ingots or blocks, represented at 26, which are to be melted, are preferably supported by the horizontal grate 18 in closely grouped relation; and, as an important feature of the present invention, for the purpose of rapidly melting the ingots, a pair of opposite, horizontally disposed rows of melting burners 27 and 28 are shown positioned in spaced openings 30 in the side walls 14 of the furnace and project through the openings inwardly and upwardly toward a concentrated area of the grate where the metal ingots are supported. Means in the form of delivery lines 27A and 28A are connected to a common fuel source 32 for delivering fuel to each of the burner rows. In addition, holding burners 34 are spaced beneath the bottom wall of the furnace, it being noted that the entire shell is mounted on suitable skids or beams 35 so that an open area is provided for positioning of the holding burners. Another delivery line 34A leads from the common fuel source 32 for supplying fuel to the holding burners, it being the purpose of these burners to maintain the metal, once melted, in the fluid state particularly at the conveying end 24 of the furnace.

As best seen from FIGURE 2, a motor drive 36 is mounted on the end wall of the furnace having a drive shaft 37 and a belt drive 38 for driving a pump 40. The pump is shown mounted on the inside of the end wall adjacent the bottom interior wall of the furnace, and is driven through the shaft 41. Broadly, the pump as well as the motor may be of any conventional make, and for instance the pump may be of the centrifugal impeller type having an intake, not shown, for withdrawal of the molten metal through the pump and through exhaust pipe 42 leading to the top of the furnace. In this manner, as the molten metal is collected and forms a pool along the bottom interior of the furnace, the holding burners 34 will serve to maintain the metal in the molten state and, as desired, the pump may be operated to withdraw the molten metal from the conveyor end of the furnace.

By way of consideration of a number of the features and elements of construction and arrangement in more detail, the entire furnace shell may be made of any temperature resistant metal such as cast iron, with or without the use of an interior refractory lining, which in the preferred form is not shown. Similarly, the elongate grate bars 19 may be composed of cast iron and are preferably in the form of generally flat rectangular members increasing in thickness toward the middle portion which serves as the concentrated area for melting purposes. Formation in this manner permits a relatively wide spacing between the bars so as to leave the metal ingots exposed to direct flame heating by the melting burners 27 and 28, and the bars are made of sufficient thickness at this area to resist any tendency to bend under the combined influence of the weight of the metal ingots and the heat developed by the particular burner arrangement.

The vertical partition 22 which serves primarily as a heat shield for the entire conveyor area including the pump and motor parts is preferably arranged to extend from side to side of the furnace and is secured thereto, such as, by means of weld, not shown. Lower end 22A of the partition terminates in spaced relation above the bottom interior surface of the furnace in order to permit the fluid metal to pass therethrough into the conveyor area for subsequent withdrawal. In this relation, the partition performs the added function of preventing any flux or inert material, having a tendency to accumulate above the fluid metal, from passing into the conveyor area.

According to the preferred form of invention, the melting and holding burners are of the aspirator type and propane burners are preferably employed due to their light weight, ease of installation and portability coupled with their ability to produce and project a flame at a very high temperature. Thus, it will be noted that each of the burners includes a barrel portion 43 having perforations 44 for the introduction of air into the barrels to combine with the fuel for ignition in a well-known manner. Here, the fuel is led from the delivery lines 27A and 28A into auxiliary lines 45 for each burner and although not shown, each burner is equipped with a suitable valve nozzle to control ejection of the fuel therefrom. For installation of the burners, it is also preferable to mount each as shown so that only the delivery end projects into the heating area of the furnace while isolating the remainder of the burner from the high temperatures encountered inside the furnace, although if desired the burners could be merely mounted along the interior side surfaces of the furnace to accomplish the same purpose. The important feature of the burner construction and arrangement is that they are arranged horizontally and directed inwardly and upwardly toward one another and toward a concentrated area of the grate so as to bring about a rapid heat buildup at the area of intersection of the flames. It has been found that this contributes greatly and in effect multiplies the temperature and heat buildup at the concentrated area far beyond that which would be expected from the individual burners and this is of utmost importance is causing rapid and continuous melting of the ingots. At the same time, the molten metal is free to fall by gravity through the open grate and to collect in the bottom of the furnace without in any way affecting the melting process.

In accordance with well-known practice, the holding burners 34 are positioned underneath the furnace as described, preferably beneath the conveyor end thereof to maintain the molten metals in the fluid state and at a temperature well above the fluid state just prior to their withdrawal through the pump and exhaust pipe 42. Of course, the high heat and temperature generated by the melting burners in the heating area of the furnace will contribute to maintain the molten metal well above its melting point along the bottom of the furnace. It will be evident, however, that the type of burner employed as the holding burner can be modified substantially in that the heat necessary to keep the metals hot once melted need not be nearly as high temperature or concentrated as that required to first melt the metals.

As shown in FIGURE 1, platforms 46 may, if desired, be positioned along the side walls of the furnace merely to serve as an aid in loading the ingots onto the grate 18. Additionally, a control panel 48 is attached to the end wall 15 adjacent to the motor 36 for mounting the necessary controls including a power control box 49 and an on-off switch box 50 to control operation of the motor and the pump. In the preferred form, the exhaust or withdrawal line 42 is shown equipped with a pair of elbows 52 and an extension pipe 53 to serve as a convenient means of attachment of a delivery line, not shown, for conducting the fluid metal away from the furnace. In addition, a drain line 54 projects from the lower end of the end wall beneath the motor so that as desired the fluid metal may either be drained out of the furnace by gravity, or alternatively may be pumped out through the withdrawal line and extension pipe 53 for delivery to the site of use. To keep the liquid in the fluid state, particularly when pumping out through an extended length of pipe, again direct flame burners should be placed along the pipe to keep it hot and to prevent the fluid metal from solidifying in the line.

An alternate form of melting the metal ingots is shown in FIGURE 4 where there is illustrated a furnace 10' again comprised of a shell structure 12' having a bottom wall 13', side walls 14' and end walls 15', the furnace being mounted on suitable skids 35'. In general the entire furnace construction is the same as that illustrated in the preferred form, a grate 18' being positioned across the open top 16' of the furnace and supported on blocks 20' with openings 30' provided for insertion of burners as in the preferred form. The modified form represents a departure from the preferred form, however, in the manner of flame heating the ingots, and here it will be seen that fuel burners 60 are mounted for projection through the openings 30' with the rows being positioned in opposite facing relation directed inwardly toward a central area of the furnace, but downwardly away from the grate 18. However, angularly disposed reflective surfaces 62 are mounted to extend in opposite directions away from the top edge of a vertical, center wall 64 to intercept the flame path of each row of burners. Due to the downward inclination of the burners, it is most feasible to use for example solid or powdered fuel burners, as opposed to the inspirator type burners shown in the preferred form, and in accordance with well-known practice, any suitable type of fuel delivery means may be employed, as schematically indicated at 65. The important feature of the modified form is the relative disposition of the reflective surfaces to the burners and to the grating 18, where the reflective surfaces are positioned in adjacent but spaced relation directly beneath the grate, shown at an angle less than 45° to the horizontal, so as to cause reflection of the flames upwardly toward a concentrated area of the grate.

In composition, both the center wall and the reflective panels may be of cast iron or steel and most desirably the reflective surfaces are faced with a fire clay coating represented at 63, although it will be apparent that other commercially available coatings may be employed in place of fire clay. In common with the preferred form, however, it is again emphasized that the modified form of flame melting provides for the direction of heat at an extremely high temperature level toward a concentrated area of the grate due to the way in which the flames are impinged and reflected off the surfaces 62.

In operation, the furnace, being portable, may be easily transported to the operating location and connected to the sources of fuel and power. Material handling equipment, such as fork lift trucks, may be used in loading the metal ingots to be melted on the grate or open support. Following initial loading, the burners are then ignited and in accordance with the preferred or modified form, melting ensues either due to direct flame or radiant heating. The fluid metal flows by gravity to the holding cavity where the fluidity is maintained by the holding burners. If desired, the products of combustion from the heat sources may be carried away by suitable flues which, although not shown, may be positioned at one end of the furnace shell. The flux or inert material which collects on top of the fluid metal and protects it from oxidation is prevented from flowing through the delivery line by the heat shield and again, the fluid may either be pumped or removed by gravity from the conveyor end of the furnace.

As melting progresses, additional ingots may be periodically placed on the grating so as to establish a continuous melting process. The holding burners will, of course, maintain the metal in the molten state and, when desired, the pump motor may be set into operation for pumping and withdrawal of the metal from the conveyor end of the furnace to the intended point of use. As mentioned, it is desirable to heat the delivery pipe connected into the extension fitting 53 and again, solid ingots can be located at the point of use so that the molten metal as it is poured in and around the ingots will cause melting of the ingots before the entire mass solidifies into final form. Accordingly, the entire method of melting, protecting, holding the metal in the molten state and conveying it away from the furnace is characterized broadly by the steps of supporting the metal on an open support portion as defined by the grate, arranging a series of burners beneath the open support on opposite sides of the grate and directing the burners inwardly for direction of the flame on a common area on the open support, followed by collecting the metal as it melts, maintaining it in a molten state in the furnace shell and thereafter pumping it from an isolated part of the furnace shell through a heated conduit to the desired location of use. In relation to the method described, emphasis is placed on the particular manner in which the flames are directed at the metal ingots to cause rapid melting thereof while at the same time, the molten metal may be conveyed away from an isolated part of the furnace without being affected by the high heat generated in the heating area of the furnace.

The above applies as well to the modified form, with the exception that the flame melting of the metal ingots is brought about by reflective heating, but again it will be noted that the heat and temperature level is reflected toward a concentrated area of the grate or open support to cause rapid melting. In this relation, it will be noted that the liquid metal will fall by gravity across the flame path and the reflective surfaces before collecting in the bottom of the furnace so that even upon melting, the liquid metal will be influenced by the direct heat of the flames to increase its temperature level well above that of the melting point. In all other respects, the method carried out in the modified form is the same as that described in relation to the preferred form.

Summarizing the many advantages and features of the present invention, there is provided a method and portable means for melting metals, particularly low melting point metals, wherein a peripheral heat source using solid, liquid or gaseous combustibles is employed to melt and hold the metals or alloys in the fluid state. The furnace construction includes means for collecting the metals in the fluid state and an isolated area for conveying the metals away from the furnace in a continuous process while heating proceeds. In the withdrawal of the metals, again the heat shield not only serves to isolate the conveying area but also to prevent flux or inert material from flowing with the liquid metal out through the pump, although in the alternative, the gravity drain may be used to conduct the fluid metal to the point of use.

In accordance with the foregoing, it will be evident that a number of changes and modifications may be made in the construction and arrangement of the furnace, for example, in the type of burners employed and in the means employed for conveying the metals away from the furnace. It is emphasized, however, that the particular arrangement of the burners in relation to the grating together with the manner in which the heating and conveyor portions of the furnace are isolated from one another are considered to be of particular advantage and utility. Furthermore, various types of manual or automatic controls can be incorporated into the furnace as required for operation, safety and efficiency. Various other modifications and changes will become apparent and will be obvious to those skilled in the art without departing from the scope of the present invention as defined by the appended claims.

What is claimed is:

1. In a portable melting and holding furnace for low melting point metals and alloys, a shell having a grate positioned across the upper open end thereof for supporting the material to be melted, a series of flame-producing burners arranged peripherally around the shell beneath said grate and being directed inwardly toward a concentrated area of said grate to establish a melting zone for direct flame-melting of the material, delivery means connected to said burners for supplying fuel thereto and withdrawing means communicating with the bottom of said reservoir for withdrawal of the metal from the furnace upon melting.

2. In a portable melting and holding furnace according to claim 1, said grate being defined by a series of spaced horizontal bars traversing said furnace, each bar increasing in thickness toward the middle to be of greatest thickness at the concentrated area for melting.

3. In a portable melting and holding furnace according to claim 1, said burners being further characterized by being supported in horizontal spaced relation around said shell beneath said grate and being directed inwardly at a common angle toward one another and upwardly toward a concentrated area of said grate.

4. In a melting and holding furnace having a temperature resistant molten metal receptacle including sides and bottom wall portions and being open at the top with a grate positioned thereacross to support metals and alloys to be heated, the combination therewith of horizontal rows of melting burners extending upwardly and inwardly through said side wall portions toward a concentrated area of said grate, delivery means connected to said burners for supplying fuel thereto whereby to bring about direct flame heating of metal disposed at the concentrated area of said grate, a vertical partition positioned in said receptacle to isolate one end from said melting burners, said partition terminating in spaced relation above the bottom wall of said receptacle, holding burners spaced beneath the isolated end, a pump secured at the isolated end of said receptacle, said pump including motor drive means and a withdrawal line for conveying the molten metal from the bottom of the receptacle to a location removed from the furnace.

5. A melting and holding furnace for low melting point metals and alloys comprising a generally rectangular shell including vertical side and end walls open at the top and having a grate positioned across the open top throughout the greater length of said furnace, vertically disposed shielding means mounted in adjacent but spaced relation to one end wall of said shell thereby to define an isolated conveyor area at said one end, a series of holding burners spaced beneath the isolated end, a series of melting burners arranged in opposite horizontal rows along the sides of said shell in adjacent spaced relation beneath said grate, said burners projecting inwardly and upwardly through openings in said sides toward a concentrated area of said grate, delivery means connected to said burners for supplying fuel thereto, and means including a pump and withdrawal line communicating with the lower interior of said furnace at the conveyor end for pumping and conveying the molten metal away from the furnace.

6. In a portable melting and holding furnace for low melting point metals and alloys, a shell having a grate positioned across the upper open end thereof for supporting the material to be melted, reflective surfaces mounted in adjacent but spaced relation beneath the grate and inclining outwardly and downwardly away from said grate, and a series of flame-producing burners arranged peripherally around the shell beneath said grate and being directed inwardly at a common angle toward said reflective surfaces for reflection of the flame path of said burners toward a concentrated area of said grate, delivery means connected to said burners for supplying fuel thereto and withdrawing means communicating with the bottom of said shell for withdrawal of the metal from the furnace upon melting.

7. A melting and holding furnace for low melting point metals and alloys comprising a generally rectangular shell including vertical side and end walls open at the top and having a grate positioned across the open top throughout the greater length of said furnace, a vertical partition mounted in adjacent but spaced relation to one end wall of said shell thereof thereby to define an isolated conveyor area at said one end, reflecting surfaces mounted centrally beneath said grate, a series of melting burners arranged peripherally around the sides of said shell, said burners being directed inwardly and downwardly toward said reflecting surfaces, and said reflecting surfaces inclining downwardly and outwardly from said grate to reflect the flame of said burners toward a concentrated area of said grate, and delivery means connected to said burners for supplying fuel thereto.

References Cited in the file of this patent

UNITED STATES PATENTS

| | | |
|---|---|---|
| 683,089 | Wideen | Sept. 24, 1901 |
| 2,041,844 | Lindner | May 26, 1936 |
| 2,154,673 | Fleck et al. | Apr. 18, 1939 |
| 2,254,809 | Tharaldsen | Sept. 2, 1941 |
| 2,264,740 | Brown | Dec. 2, 1941 |
| 2,756,044 | Neumann | July 24, 1956 |
| 2,849,768 | Bungay | Sept. 2, 1958 |